O. F. KENDALL.
TRANSMISSION BAND LINING.
APPLICATION FILED NOV. 21, 1921.
1,432,758.
Patented Oct. 24, 1922.
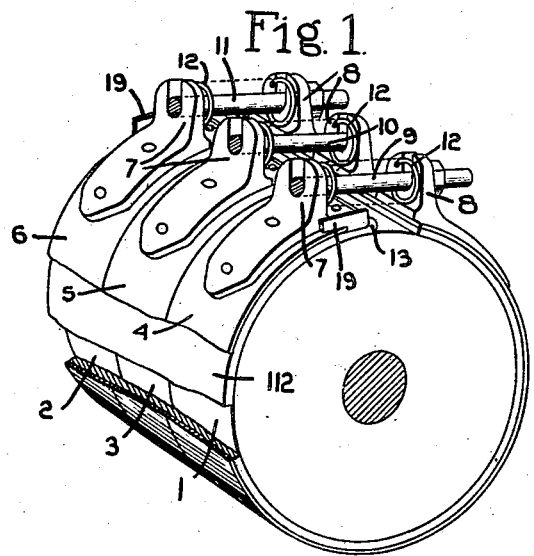
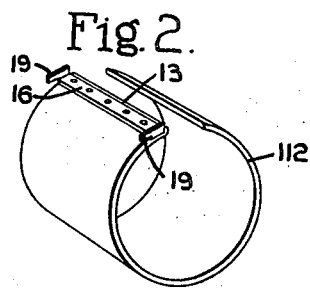
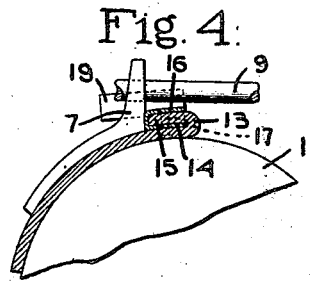
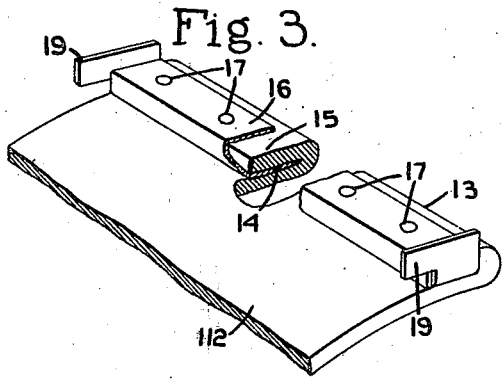
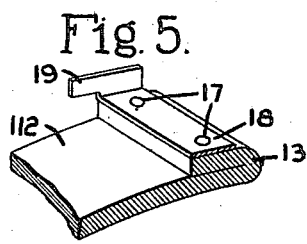
Inventor.
Olindus F. Kendall
Attys.

Patented Oct. 24, 1922.

1,432,758

UNITED STATES PATENT OFFICE.

OLINDUS F. KENDALL, OF CAMBRIDGE, MASSACHUSETTS.

TRANSMISSION-BAND LINING.

Application filed November 21, 1921. Serial No. 516,523.

*To all whom it may concern:*

Be it known that I, OLINDUS F. KENDALL, a citizen of the United States, and resident of Cambridge, county of Middlesex, State of Massachusetts, have invented an Improvement in Transmission-Band Linings, of which the following description, in connection with the accompanying drawing, is a specification, like characters on the drawing representing like parts.

This invention relates to transmission band linings such as are used on automobiles of the planetary transmission type and especially to transmission band linings of that type which are of a width equal to the combined widths of the transmission bands so that a single lining serves as the lining for the three transmission bands.

One of the objects of the invention is to provide a transmission band lining of this type with improved means for retaining the lining in place while at the same time permitting it to be readily inserted between the transmission bands and the transmission drums when a new lining is required.

My improved transmission band lining is formed at one end with a head extending the full width of the band and which is of a thickness greater than the normal distance between the transmission bands and the transmission drums. When the transmission lining is in place this head rests against up-standing ears at the ends of the transmission bands and its engagement with these ears retains it in place and prevents it from being drawn down between the bands and the drums when the bands are tightened.

In order to give an understanding of the invention I have illustrated in the drawings some selected embodiments thereof which will now be described after which the novel features will be pointed out in the appended claims.

In the drawings, Fig. 1 is a perspective view of a portion of the transmission mechanism of an automobile showing my improved transmission band lining in place.

Fig. 2 is a perspective view of the transmission band removed.

Fig. 3 is an enlarged perspective view of the head end of my improved transmission band.

Fig. 4 is a fragmentary sectional view showing the manner in which the head 13 operates to hold the lining in place.

Fig. 5 is a sectional perspective view showing a modified form of the invention.

In the drawings 1, 2 and 3 indicate the three drums of a planetary type transmission, 1 being the brake drum, 2 the reverse drum and 3 the low speed drum. The transmission bands which enclose these drums are indicated at 4, 5 and 6 respectively and each band is formed at its end with the up-standing parts 7, 8 through which pass the usual rods 9, 10 and 11 by which the bands are tightened and which are actuated by the usual pedals. Each rod has a spring 12 thereon between the up-standing parts 7 and 8 of the corresponding brake band and by which the brake bands are opened when pressure is released from the treadle.

The parts thus far described are or may be all as usual and form no part of the present invention.

My improved transmission lining is indicated at 112 and it is of that type which is of a width equal to the combined widths of the transmission bands 4, 5 and 6 so that a single lining member suffices for lining all the bands.

As stated above the invention relates particularly to the constructional features of the lining 112 which provide means for retaining the lining in place after it has been inserted between the transmission bands and the drums.

One advantage of a transmission band lining of this type is that it can be inserted in position thereby to reline the transmission bands without the necessity of removing the upper half of the transmission casing and of removing the transmission bands, as is the common practice where the transmission bands are to be relined.

My improved transmission band lining 112 is provided at one end with a head 13 which extends the full width of the lining and is of a thickness greater than the normal distance between the transmission bands and the drums. When the transmission band lining is in place this head 13 lies against the base of the up-standing portion 7 of the transmission bands and because of its thickness it retains the lining in place when anyone of the bands are tightened. This head 13 is constructed so that it will not tear out or give way due to the strain to which the lining is submitted when the bands are tightened.

The head 13 may be formed in various ways without departing from the invention, but I will preferably make it by bending the material of the transmission band lining back on itself so as to make a portion of double thickness and then firmly securing the folded over portion in place by means of a reinforcing strip of metal which overlies the folded over and doubled portion of the lining and is riveted solidly thereto. One way in which this may be accomplished is to take a strip of metal 14 and place it on the transmission lining near one end and then to fold the end 15 of the lining over the metal strip. This metal strip may be of a greater width than the folded portion 15 in which case the metal strip will then be folded over the folded end of the transmission lining and the metal reinforcing member 14 and the folded end of the lining may then be riveted together by means of suitable rivets 17. This makes a head of the required thickness which extends clear across the transmission band lining and which will withstand all the strain to which the transmission band lining is put without danger of giving way.

Another way of making the head 13 is to fold the end 15 of the transmission band lining back on the body thereof as shown in Fig. 5 and then to apply a reinforcing strip 18 of metal to the folded over portion of the lining, said metal and folded portion of the lining being riveted together by rivets 17.

In both forms of the invention a head 13 is provided which is reinforced with metal and which is of a thickness considerably greater than the normal space between the transmission bands and the drums so that when the lining is put in place with the head resting against the base of the up-standing ears 7 of the transmission bands, said head will co-operate with said up-standing portion 7 to prevent the lining from being drawn into the space between the bands and the drums when the bands are tightened.

I may, if desired, make the head 13 of the transmission lining with ears 19 that are adapted to engage the outer sides of the two outer transmission bands 4 and 6 thereby to prevent movement of the lining in an axial direction or transversely of the drums. These ears 19 may conveniently be formed by bending up the end portions of the metal reinforcing strips 14 or 18.

I claim.

1. The combination with the three drums of an automobile transmission of the planetary type and the transmission bands therefor, each having at its ends the usual up-standing ears, of a transmission band lining of a width equal to the combined widths of the three transmission bands, said lining having at one end a head portion extending transversely thereacross and which is of greater thickness than the space between the transmission bands and the transmission drums and which engages the base of the up-standing ears of said bands and thereby holds the lining in place.

2. A transmission band lining for an automobile transmission of the planetary type having three transmission drums and transmission bands therefor, said lining having a width equal to the combined widths of the transmission bands and having one end thereof folded back on itself and a reinforcing metal strip co-extensive with the folded over portion and rigidly secured thereto, said folded over portion and strip forming a head having a thickness greater than the space between the transmission bands and the drums and adapted to rest against the base of the up-standing ears of said transmission bands.

3. A transmission band lining for an automobile transmission of the planetary type having three transmission drums and transmission bands therefor, said lining having a width equal to the combined widths of the transmission bands and having one end thereof folded back on itself and a reinforcing metal strip co-extensive with the folded over portion and rigidly secured thereto, said folded over portion and strip forming a head having a thickness greater than the space between the transmission bands and the drums and adapted to rest against the base of the up-standing ears of said transmission bands, said lining also having ears at the ends of the head which are adapted to engage the edges of the outside transmission bands thereby to prevent lateral movement of the band.

In testimony whereof, I have signed my name to this specification.

OLINDUS F. KENDALL.